No. 670,859. Patented Mar. 26, 1901.
E. R. FELLOWS.
RACK GENERATING MACHINE.
(Application filed Aug. 11, 1900.)
(No Model.) 6 Sheets—Sheet 1.
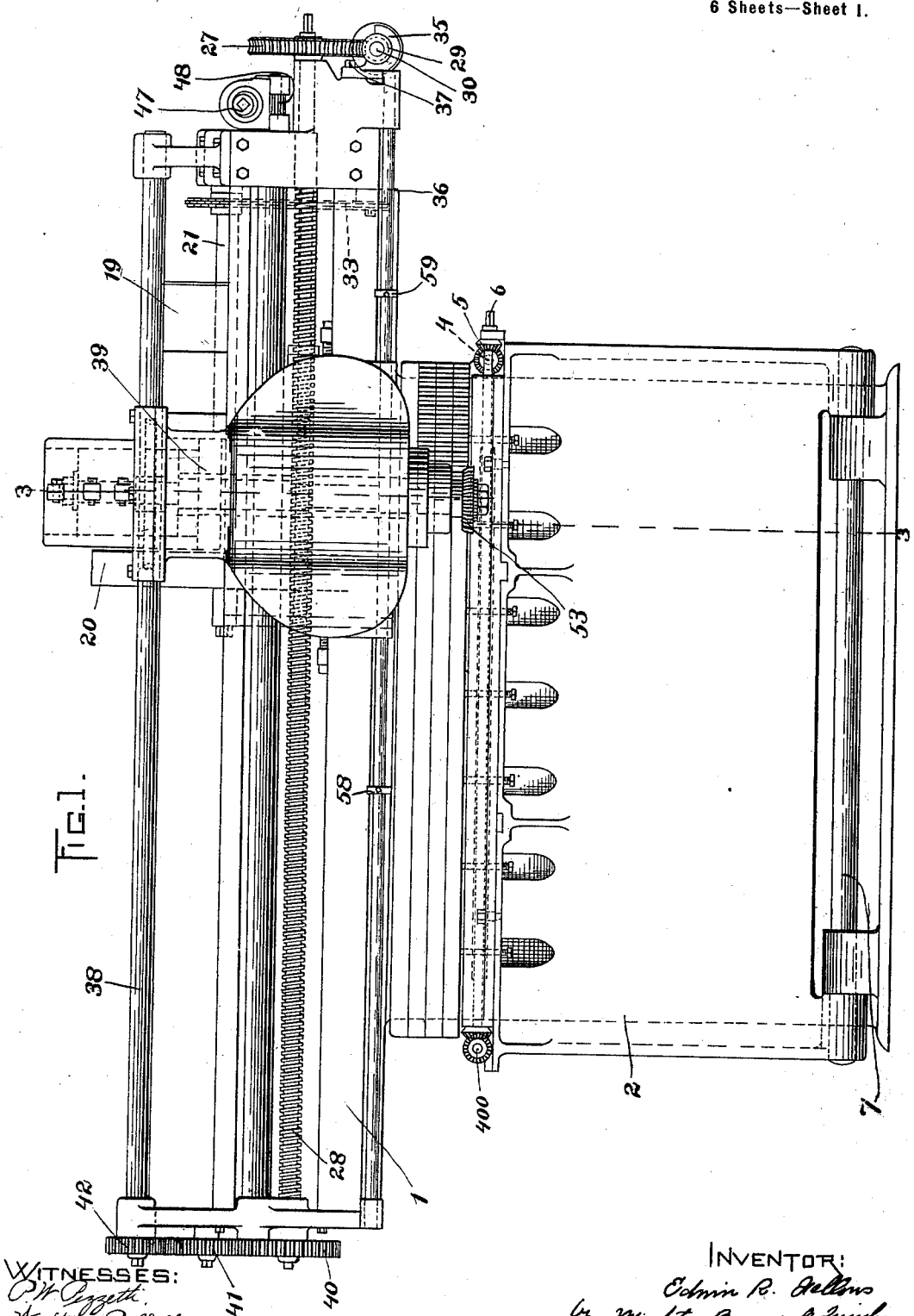
WITNESSES:
INVENTOR:

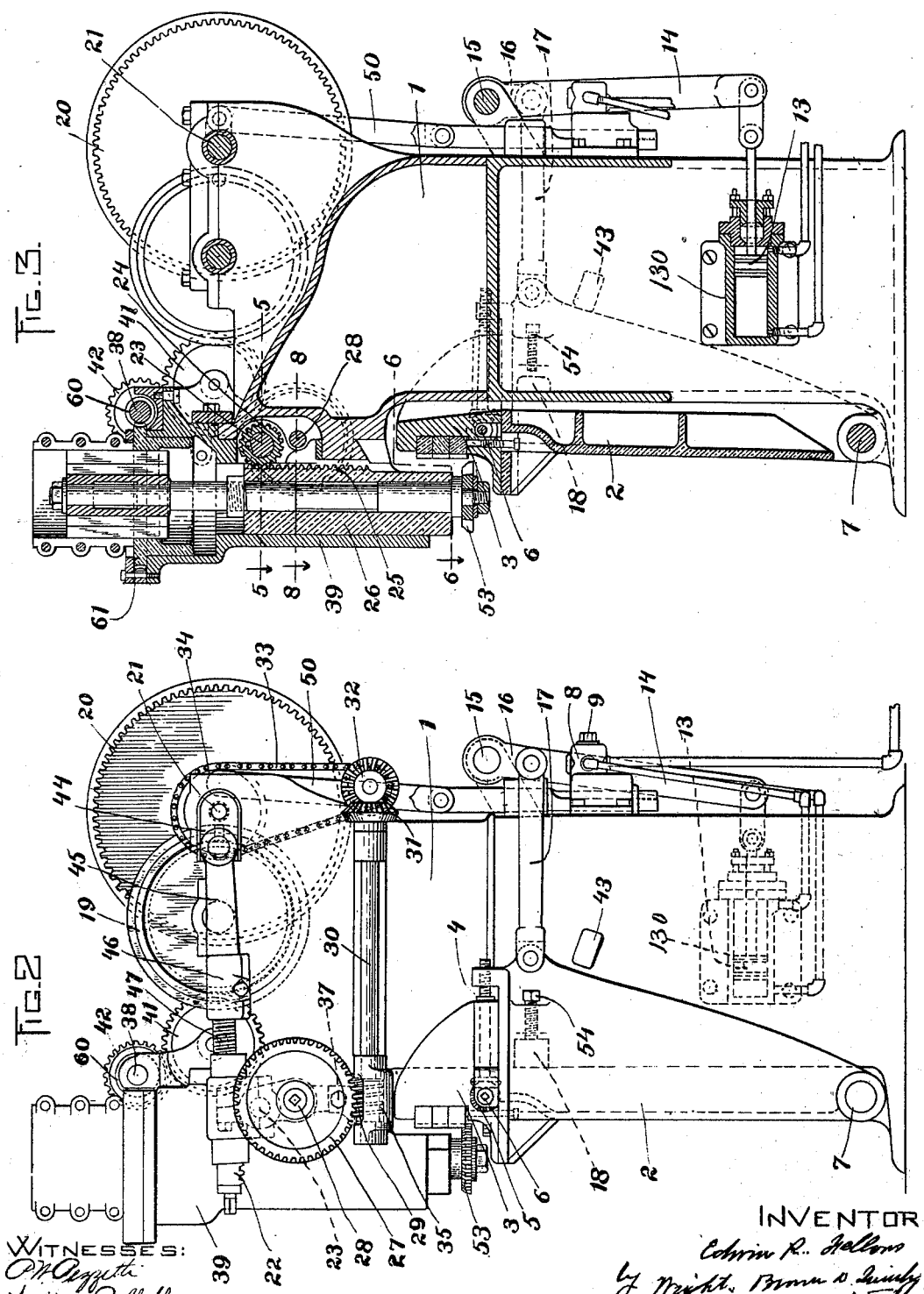

No. 670,859.  
E. R. FELLOWS.  
RACK GENERATING MACHINE.  
(Application filed Aug. 11, 1900.)  
Patented Mar. 26, 1901.
(No Model.)  
6 Sheets—Sheet 3.
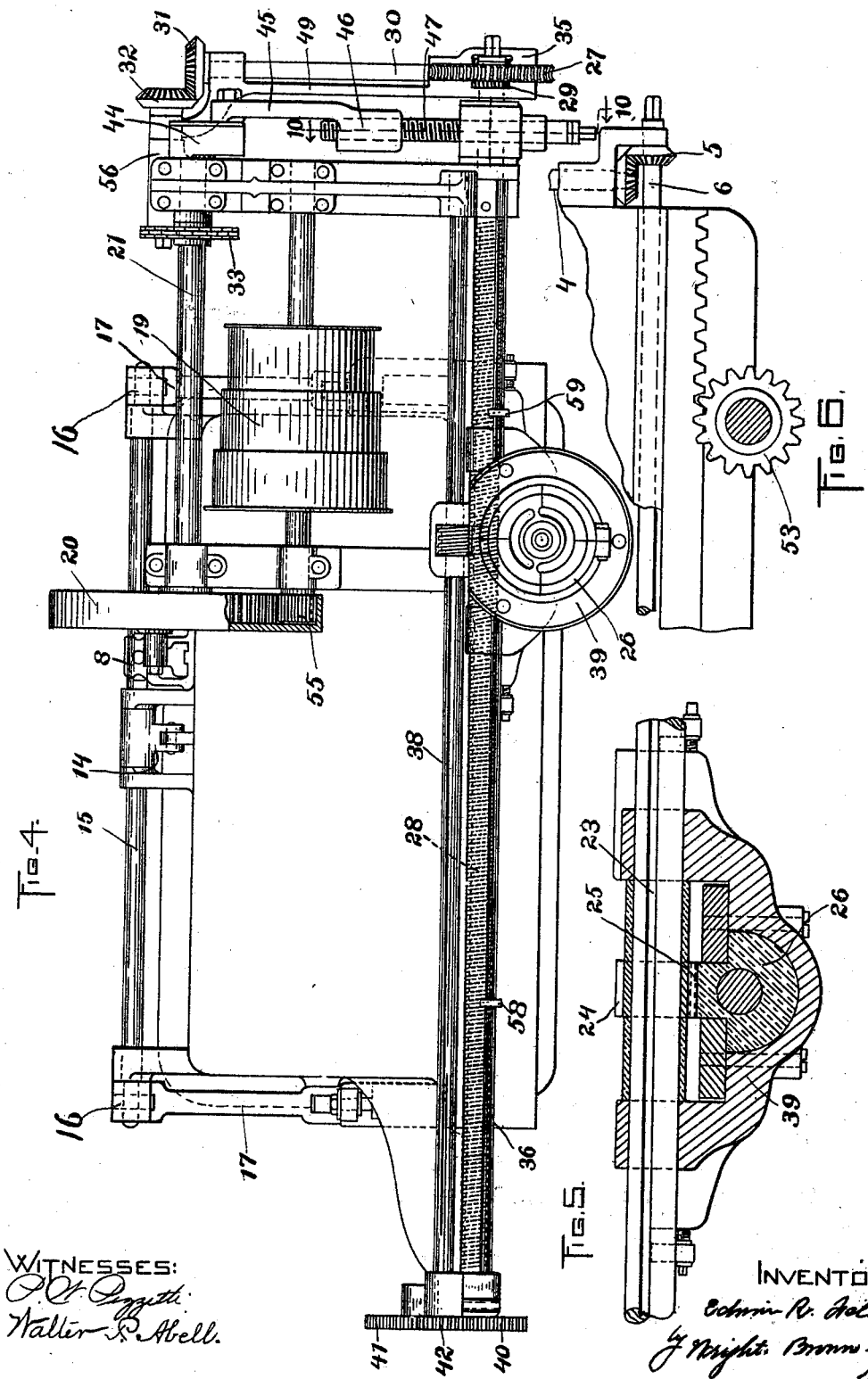

No. 670,859. Patented Mar. 26, 1901.
E. R. FELLOWS.
RACK GENERATING MACHINE.
(Application filed Aug. 11, 1900.)
(No Model.) 6 Sheets—Sheet 4.
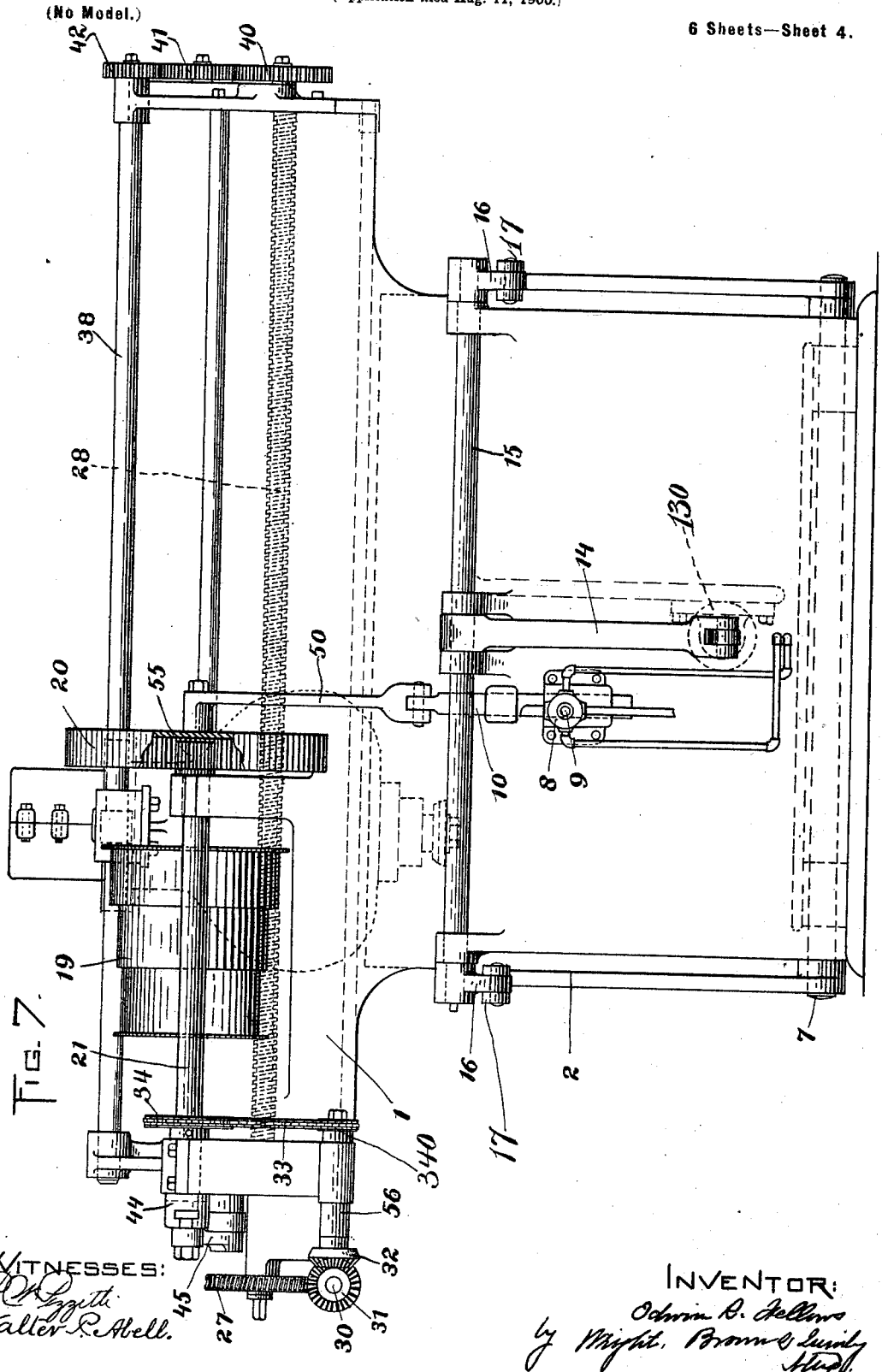
INVENTOR:

No. 670,859. Patented Mar. 26, 1901.
E. R. FELLOWS.
RACK GENERATING MACHINE.
(Application filed Aug. 11, 1900.)

(No Model.) 6 Sheets—Sheet 5.

No. 670,859. Patented Mar. 26, 1901.
E. R. FELLOWS.
RACK GENERATING MACHINE.
(Application filed Aug. 11, 1900.)
(No Model.) 6 Sheets—Sheet 6.
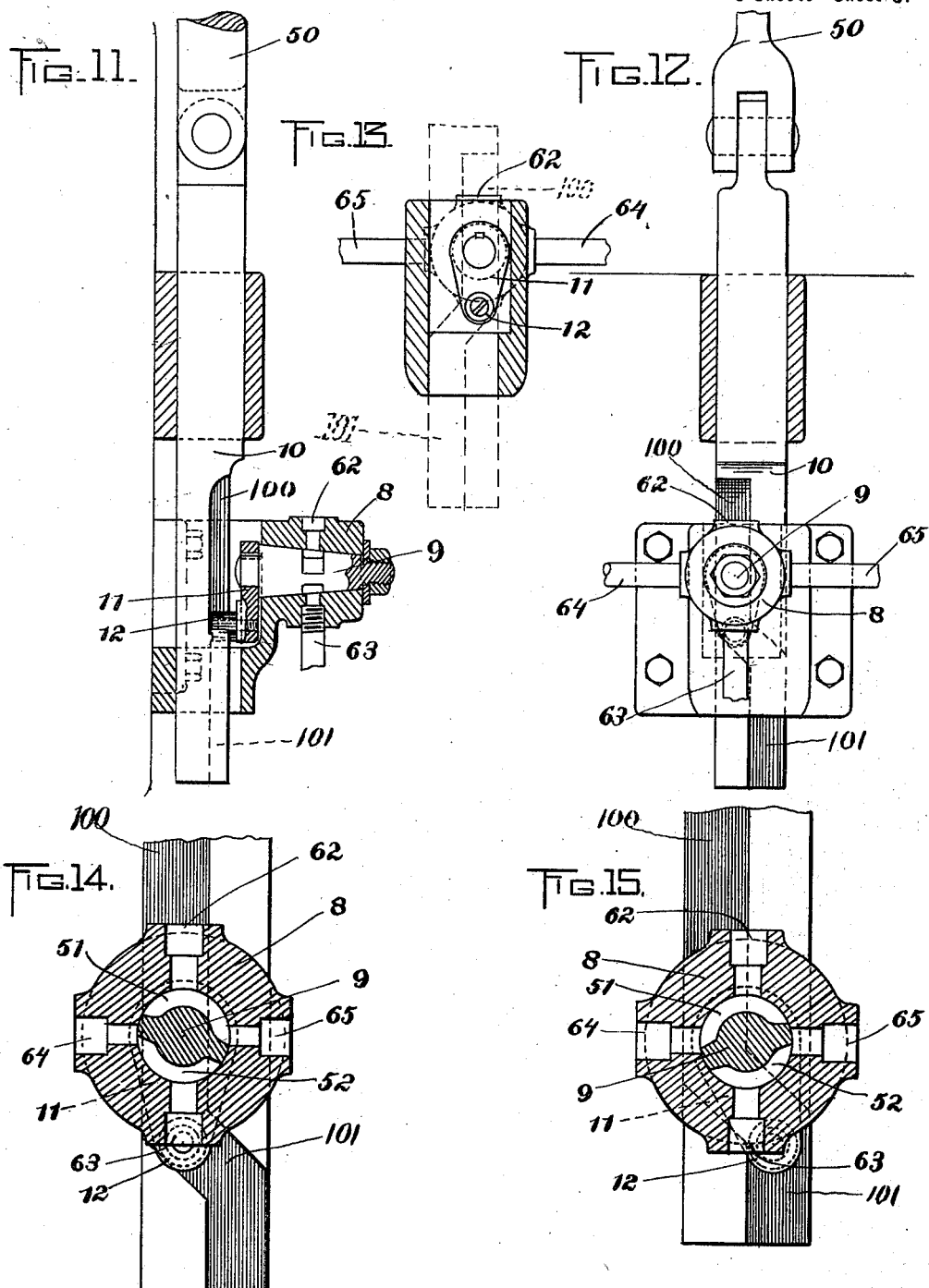

UNITED STATES PATENT OFFICE.

EDWIN R. FELLOWS, OF SPRINGFIELD, VERMONT.

RACK-GENERATING MACHINE.

SPECIFICATION forming part of Letters Patent No. 670,859, dated March 26, 1901.

Application filed August 11, 1900. Serial No. 26,600. (No model.)

*To all whom it may concern:*

Be it known that I, EDWIN R. FELLOWS, of Springfield, in the county of Windsor and State of Vermont, have invented certain new and useful Improvements in Rack-Generating Machines, of which the following is a specification.

This invention relates to metal-planing machines in general, and in particular to machines for shaping gears on the principle disclosed in my Patent No. 579,708, dated March 30, 1897.

The invention further relates to machines for generating racks, which may be considered as gears of infinite diameter, by means of a gear-shaped cutter having a reciprocating cutting movement and a rotary feed movement.

One object of the invention is to provide a simplified machine in which the entire feed, rectilinear or planetary as well as rotary, is given to the cutting-tool, while the blank operated on is held stationary except for a back-and-forth movement sufficient to clear the work away from the cutting-tool on the return stroke of the latter.

A further object of the invention is to provide machines of this class with improved means for stopping the feed of the cutter.

The invention consists in the novel mechanism hereinafter described and claimed for carrying out the above objects and others incidental thereto.

Figure 8:
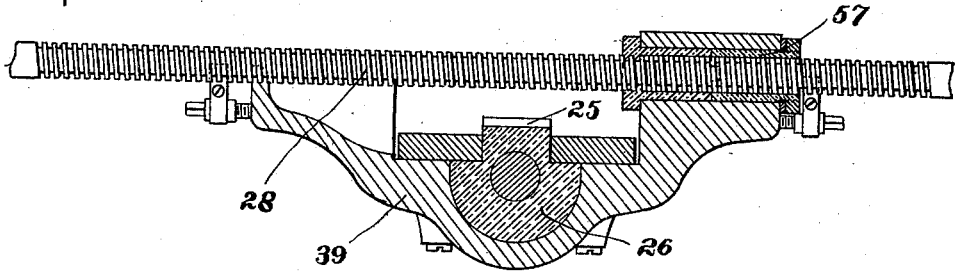
Figure 9:
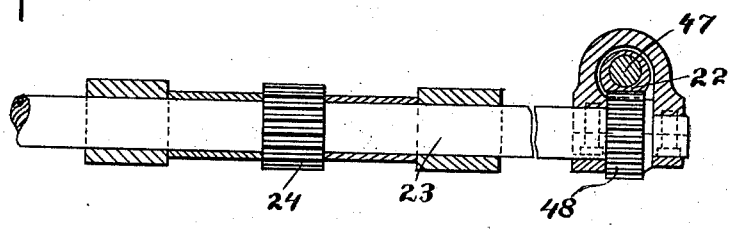
Figure 10:
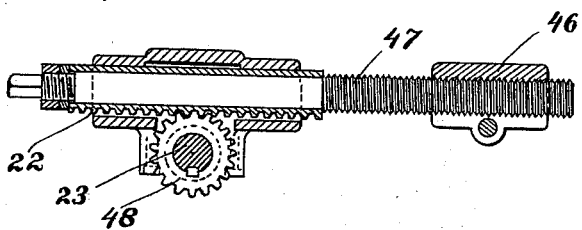

In the drawings, Figure 1 represents a front elevation of a rack-cutting machine embodying my invention. Fig. 2 represents an end elevation of the machine as seen from the right of Fig. 1. Fig. 3 represents a cross-section of the machine, taken on the line 3 3 of Fig. 1. All of these views show the cutter at the end of its downward or cutting stroke, and Fig. 3 shows the work withdrawn to clear the cutter on its return stroke and the detail of the mechanism for withdrawing the work. Fig. 4 represents a plan view. Fig. 5 represents a section on line 5 5 of Fig. 3 of the saddle or casting in which operates the cutter-slide. Fig. 6 represents a portion, enlarged, of a plan view of the part of the machine below the line 6 6 of Fig. 3. Fig. 7 represents a rear elevation of the machine. Fig. 8 represents a sectional view similar to that shown by Fig. 5 on the line 8 8 of Fig. 3. Figs. 9 and 10 represent detail views of the rocker-shaft employed for reciprocating the cutter, Fig. 10 being a section on line 10 10 of Fig. 4. Figs. 11 to 15 represent enlarged detail views of the mechanism for presenting and withdrawing the work to and from the cutter.

Referring to the drawings, 1 is the frame of a machine for shaping racks, which carries a cutting-tool 53, having the form of a spur-gear, but made of hardened steel with sharp cutting edges and with the sides of its tooth-like projections backed off or tapered backward from the cutting edges, so that only the part of the tool that acts on the work is in contact at any time with the work. The cutter is given a vertical reciprocating motion and acts on a blank or a number of blanks securely fastened in a vise 3, which is mounted on a massive apron 2 and is adjustable on the apron by means of screws 4 and 400, held in bearings in the vise and screwing into lugs on the apron and capable of being moved in unison by bevel-gears 5, attached to the shaft 6, which gears mesh with bevel-gears attached to the screws.

Power is given to the machine from a counter-shaft or other source of power through the cone-pulley 19, which turns a pinion 55, in mesh with an internal or annular gear 20, secured to one end of a shaft 21, which shaft is furnished at its other end with a crank 44, (see Figs. 2, 4, 7, 9, and 10,) engaged with a pitman 45, one end of which is offset and formed into a split nut 46. Into the split nut is screwed a threaded rod 47, to which is attached a rack 22, in gear with a pinion 48, keyed to a rocker-shaft 23. As the rack 22 is reciprocated by the action of the cone-pulleys and the annular gear 20 the rocker-shaft is rotated first in one direction and then in the other, causing vertical reciprocation of the slide 26 in a casting or saddle 39 by means of the pinion 24 on the shaft 23 and a rack 25 on the slide. The spindle to which is secured the cutting-tool 53 is secured in bearings in the slide 26 and reciprocates with it. The pitman 45 is secured to the crank 44 by a bolt, the head of which is held in a slot running lengthwise in the crank, so that by changing the position of the bolt in the slot to a point near or somewhat removed from the center of the shaft 21 the travel of the cutter can be diminished or increased. This mechanism is claimed in my copending application, Serial No. 721,832.

The saddle 39, which carries the slide 26, supporting the cutter 53, is furnished with a nut 57, threaded on a lead-screw 28, which turns in bearings on the frame 1. Rotation of the lead-screw, causing longitudinal motion of the saddle, is produced by a worm-wheel 27, fast to one end of the lead-screw and turned by a worm 29 on a shaft 30, to which motion is communicated from the shaft 21 through the sprocket 34, chain 33, sprocket 340, shaft 56, and bevel-gears 31 and 32. The worm 29 is held in a worm-box 35, provided with bearings in which the shaft 30 turns, and attached to an arm 49, capable of swinging about the shaft 56, so that its angular position my be changed without throwing the bevel-wheels 31 and 32 out of gear with each other. A trip-rod 36 locks the box 35 in position, so that the worm 29 and wheel 27 mesh properly, and is provided with adjustable collars 58 and 59, adapted to engage with the saddle and move the rod 36 in one direction or the other. When the saddle moves from right to left in Figs. 1 and 4, it strikes the collar 58, throwing the rod 36 to the left, and when the saddle travels from left to right it strikes the collar 59, moving the rod to the right; but the mechanism is so arranged that end motion of rod in either direction releases the worm-box 35 and allows it to drop a sufficient distance to separate the worm 29 and worm-wheel 27. A screw 37 projects into an elongated slot in the worm-box 35 and holds it laterally while allowing it to drop a short distance.

In addition to the longitudinal feed the cutter is given a slow rotary movement, so that its resultant feeding motion is a rolling one along the blank, similar to the motion of a pinion in mesh with the rack. This rotary feed is given the cutter by a splined feed-rod 38, which receives motion from the lead-screw 28 through the train of gears 40, 41, and 42 and which rotates a worm 60, that is held in end-thrust bearings in the saddle 39, so as to be capable of moving longitudinally on the rod 38, and in mesh with a worm-wheel 61, which rotates the spindle carrying the cutter. The worm-wheel 61 is held in bearings in the saddle 39, which keep it in mesh with the worm 60, and is attached to the cutter-carrying spindle by a spline or otherwise, so as to give it a motion of rotation and at the same time allow it to reciprocate. The screw 28 and rod 38 are parallel.

It has been found, in machines for shaping racks, undesirable to give any feeding motion to the blank while the cutter remains relatively stationary, as shown in the aforesaid patent, for when the blank is moved lengthwise in unison with the rotary motion of the cutter it is necessary to provide a very heavy slide, which is not desirable, for holding the blank to insure sufficient stiffness and prevent the slide from giving trouble by cramping on its guide. This difficulty has been overcome by making the blank stationary, except for a slight back-and-forth movement, and this feature and the device for clearing the work from the cutter constitute the most important part of my present invention.

As has been already stated, the blank is rigidly secured on an apron 2, which is capable of oscillation about a shaft 7, held in the frame 1 of the machine, and is moved through a small angle by a mechanism about to be described. The apron 2 is connected through the connecting-rods 17, arms 16, (of which there are two, giving positive connection between the apron and shaft 15 and preventing springing of the latter,) shaft 15, and arm 14, with a piston 13, working in an independent cylinder 130 under the influence of compressed air or other fluid, the inflow and egress of which to and from the cylinder are controlled by a valve 9, operated by the machine. The annular gear 20, through which the cutter is reciprocated, also reciprocates, through the connecting-rod 50, a plunger 10, provided with a longitudinal groove 100, having an offset 101 at its middle point, which acts on a roller 12 in the manner of an ordinary cam-groove, as is clearly shown in Figs. 11 to 15. The roller 12 is mounted on an arm 11, secured to the valve 9, and by the action of the cam-groove turns the valve back and forth, admitting compressed air first into one end and then into the other end of the cylinder. The valve-operating mechanism is so arranged that when the cutter reaches the end of its downward or cutting stroke the valve is turned so as to admit air to the head end of the cylinder when the parts are arranged as shown by Figs. 2 and 3, drawing the blank backward, and when the cutter reaches the end of its upstroke air is admitted to the crank end of the cylinder and the blank pushed forward into position. Stops 43 on the frame of the machine limit the backward travel of the apron, and stops 18 limit its forward travel. Screws 54 in lugs on the apron bear against the stops 18 and may be adjusted to vary the position of the apron to compensate for any wear which may occur. In the position shown by Figs. 2 and 14 the cutter is just finishing its downward stroke and the valve is beginning to move so as to cut off the air-supply from the crank end of the cylinder and admit it to the head end, and in the position shown by Figs. 3 and 15 the plunger 10 has advanced far enough, while the cutter remains substantially stationary, to open communication to the head end of the cylinder and move the apron with the blank back out of the way of the ascending cutter.

The valve is preferably a tapered plug fitting into a conical seating in a valve-chest 8 of substantially cylindrical form, as here shown, having in it in a plane perpendicular to the axis a compressed-air inlet 62, an exhaust-outlet 63, an outlet 64, communicating with the head end, and one, 65, communicating with the crank end of the cylinder. Two chambers 51 and 52 are cut in the valve in the plane of the air-passages and are separated from each other in such a way that compressed air can pass from the inlet 62 into either end of the cylinder and at the same time be exhausted from the other end to the outlet 63. This method of separating the work from the cutter at the end of the stroke is better than any other known to me, in that it is more rapid than any other method in which the movement is produced by the machine itself, and it takes no power from the machine, since the motion is produced by a piston worked from an independent source of power.

I do not limit myself to the details of the mechanism here used and reserve the right to use any other form of feed and driving mechanism that will give the result accomplished by the machine described, and I may use any form of valve or valve-operating device for controlling the movements of the fluid-controlled piston.

I claim—

1. In a gear-generating machine, a gear-shaped cutter adapted to cut or plane by a reciprocating movement with respect to the work, means to hold the work stationary as respects feeding movement, and means to impart a feeding movement of rotation and translation to the cutter.

2. In a rack-generating machine, the combination of a gear-shaped cutter adapted to cut or plane by a reciprocating movement with respect to the work, means to hold the work stationary as respects feeding movement, and means to impart a rectilinear and rotary feeding movement to the cutter.

3. In a gear-generating machine, a gear-shaped cutter adapted to cut or plane by a reciprocating movement with respect to the work, means to hold the work stationary as respects feeding movement, a saddle carrying the cutter and mounted to slide on rectilinear guides, means to impart a rotary feed movement to the cutter, and means to impart a rectilinear cutter-feeding movement to the saddle.

4. In a gear-generating machine, a gear-shaped cutter adapted to cut or plane by a reciprocating movement with respect to the work, means to hold the work stationary as respects feeding movement, a saddle carrying the cutter and mounted to slide on rectilinear guides, means to impart a rectilinear cutter-feeding movement to the saddle, means to impart a rotary feeding movement to the cutter, and mechanism connecting said saddle-feeding and cutter-feeding mechanisms, whereby the combined feeding movement of the cutter is made equivalent to that of a pinion rotating in mesh with a stationary rack.

5. In a gear-generating machine, a gear-shaped cutter adapted to cut or plane by a reciprocating movement with respect to the work, means to hold the work stationary as respects feeding movement, a saddle mounted to slide on rectilinear guides, a saddle-feeding rotary screw-rod, a nut on the saddle engaging said rod, a cutter-rotating rod mounted parallel to said screw-rod, cutter-rotating means mounted in the saddle and having a sliding spline connection with the second said rod, and means to rotate said rods at a predetermined relative speed, to feed the cutter.

6. In a gear-generating machine, a gear-shaped cutter adapted to cut or plane by a reciprocating movement with respect to the work, means to hold the work stationary as respects feeding movement, a saddle carrying the cutter and mounted for a sliding feed movement on rectilinear guides, cutter-rotating and saddle-feeding mechanisms, and means operated by a predetermined feeding movement of the saddle for rendering the saddle-feeding mechanism inoperative.

7. In a gear-generating machine, a gear-shaped cutter adapted to cut or plane by a reciprocating movement with respect to the work, means to hold the work stationary as respects feeding movement, a saddle carrying the cutter and mounted for a sliding feed movement on rectilinear guides, cutter-rotating and saddle-feeding mechanisms, and means operated by a predetermined feeding movement of the saddle for rendering the saddle-feeding mechanism inoperative, said means including a locking-rod mounted parallel to the direction of movement of the saddle and a collar adjustably mounted on said rod and adapted to be engaged by said saddle to slide the rod longitudinally.

8. In a gear-generating machine, a gear-shaped cutter adapted to cut or plane by a reciprocating movement with respect to the work, means to hold the work stationary as respects feeding movement, a saddle carrying the cutter and mounted for a sliding feed movement on rectilinear guides, means to impart a rotary feeding movement to the cutter, a rotary saddle-feeding rod having a worm-gear, a worm engaged with said worm-gear and mounted on a worm-shaft, means to rotate said worm-shaft, a pivotal arm carrying said worm-shaft and adapted to be oscillated to throw the worm out of mesh without disengaging the worm-shaft from its rotating means, and locking means adapted to normally hold said arm with the worm in mesh and displaced by a predetermined feeding movement of the saddle.

9. In a rack-cutting machine, a reciprocating cutter, a work-holding apron hinged to a support, means to mount a rack blank or blanks on said apron parallel to the hinge-axis thereof, and means to oscillate said apron to clear the work on the return stroke of the cutter.

10. In a rack-generating machine, a gear-shaped cutter adapted to cut or plane by a reciprocating movement with respect to the work, a work-holding apron hinged to a support, means to mount a rack blank or blanks on said apron parallel to the hinge-axis thereof, means to cause a feed movement of the cutter with respect to the work-holder equivalent to that of a pinion rotating in mesh with a rack, means to reciprocate the cutter, and means to oscillate the apron to clear the work on the return stroke of the cutter.

11. In a gear-generating machine, a reciprocating cutter, a support, means to move said support to clear the work on the return stroke of the cutter, and a work-holder adjustable on said support toward and from the cutter.

12. In a rack-generating machine, a gear-shaped cutter adapted to cut or plane by a reciprocating movement with respect to the work, means to impart rotary and rectilinear feed movement thereto, a support, and a work-holding vise mounted on said support and adjustable thereon toward and from the cutter.

13. In a rack-generating machine, a gear-shaped cutter adapted to cut or plane by a reciprocating movement with respect to the work, means to impart a rotary and rectilinear feed movement thereto, a support, a work-holding vise mounted on said support and adjustable thereon toward and from the cutter, a plurality of screw-rods located at different points along said vise and adapted to adjust the same by their rotation, and means to simultaneously rotate said screw-rods.

14. In a metal-planing machine, a metal-planing cutter, means to hold the work, means to cause a reciprocating cutting movement of said cutter with respect to the work, and independent fluid-operated means to clear the work on the return stroke of the cutter.

15. In a metal-planing machine, a metal-planing cutter, means to hold the work, cutter-reciprocating mechanism, fluid-operated means to clear the work on the return stroke of the cutter, and valve mechanism controlling said fluid-operated means and controlled by the cutter-reciprocating mechanism.

16. In a metal-planing machine, a work-support, a metal-planing cutter, means to cause a reciprocating cutting movement of said cutter with respect to the work-support, a fluid-operated piston connected with and adapted to reciprocate said work-support to clear the work on the return stroke of the cutter, and valve mechanism controlling said piston and controlled by the cutter-reciprocating means.

17. In a metal-planing machine, a work-support, a metal-planing cutter, means to cause a reciprocating cutting movement of said cutter with respect to the work-support, independent fluid-operated means for reciprocating said work-support to clear the work on the return stroke of the cutter, a stop on the machine-frame, and a coacting stop on the work-support adapted to limit the positioning movement of the work-support.

18. In a metal-planing machine, a work-support, a metal-planing cutter, means to cause a reciprocating cutting movement of said cutter with respect to the work-support, a fluid-cylinder and a piston therein adapted to reciprocate said work-support to clear the work on the return stroke of the cutter, valve mechanism controlling said piston, a fixed stop, and a coacting stop on the work-support adapted to limit the positioning movement of the work-support.

19. In a metal-planing machine, a work-support, a metal-planing cutter, means to cause a reciprocating cutting movement of said cutter with respect to the work-support, a rock-shaft having arms connected by links to said work-support, a fluid-operated piston, an arm mounted on the rock-shaft and connected with said piston, whereby the shaft is oscillated, and means to control said piston.

20. In a metal-planing machine, a work-support, a metal-planing cutter, means to cause a reciprocating cutting movement of said cutter with respect to the work-support, fluid-operated means to reciprocate said work-support to clear the work on the return stroke of the cutter, a plug-valve controlling said means and having an arm, and a plunger operating on said arm and reciprocated by the cutter-reciprocating mechanism.

In testimony whereof I have affixed my signature in presence of two witnesses.

EDWIN R. FELLOWS.

Witnesses:
FRANK D. BLACKISTONE,
R. M. PIERSON.